United States Patent
Friedman et al.

(10) Patent No.: US 11,900,279 B2
(45) Date of Patent: *Feb. 13, 2024

(54) PARKING SPACE ROUTING

(71) Applicant: INRIX INC., Kirkland, WA (US)

(72) Inventors: Samuel Eugene Gold Friedman, Santa Monica, CA (US); Alexander David Israel, Los Angeles, CA (US); Keith Matthew Hackbarth, Los Angeles, CA (US)

(73) Assignee: INRIX INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,074

(22) Filed: Oct. 11, 2021

(65) Prior Publication Data

US 2022/0027801 A1    Jan. 27, 2022

Related U.S. Application Data

(63) Continuation of application No. 15/336,966, filed on Oct. 28, 2016, now Pat. No. 11,144,848.

(51) Int. Cl.
*G06Q 10/02* (2012.01)
*G06Q 10/0631* (2023.01)
(Continued)

(52) U.S. Cl.
CPC .......... *G06Q 10/02* (2013.01); *G01C 21/3407* (2013.01); *G01C 21/3453* (2013.01);
(Continued)

(58) Field of Classification Search
CPC .... G06Q 10/02; G06Q 30/0284; G06Q 30/08; G01C 21/3685
(Continued)

(56) References Cited

U.S. PATENT DOCUMENTS

| | | |
|---|---|---|
| 7,181,426 B2 | 2/2007 | Dutta |
| 7,538,690 B1 | 5/2009 | Kaplan et al. |

(Continued)

FOREIGN PATENT DOCUMENTS

| | | | | |
|---|---|---|---|---|
| EP | 2608184 A1 | 6/2013 | | |
| EP | 2772876 A1 * | 9/2014 | ............ | G06Q 10/02 |
| EP | 2772876 A1 | 9/2014 | | |

OTHER PUBLICATIONS

"Proactive Vehicle re-routing strategies for congestion avoidance," Juan Pan, Mohammad Khan, Iulian Popa, Karine Zeitouni, and Cristian Borcea. Department of Computer Science New Jersey Institute of Technology. (Year: 2012).*

(Continued)

*Primary Examiner* — Omar Zeroual
*Assistant Examiner* — Brian Adams Heflin
(74) *Attorney, Agent, or Firm* — COOPER LEGAL GROUP, LLC

(57) ABSTRACT

One or more techniques and/or systems are provided for parking space routing. For example, parking data for a parking region, such as a parking lot, may be obtained from one or more data sources (e.g., vehicle sensor data, a parking lot camera, parking meter transaction data, etc.). Routes from a current location of a vehicle to available parking spaces within the parking region may be computed. The routes may be ranked based upon various criteria, such as convenience, congestion, travel time, travel distance, a parking space fill order, etc. A route, having a rank above a threshold (e.g., a highest ranked route), may be provided to a driver of the vehicle, such as through a vehicle navigation unit, a mobile device, a wearable device, etc. The route may be provided to autonomous driving functionality of the vehicle for automatic routing and navigation of the vehicle to the parking space.

19 Claims, 10 Drawing Sheets

(51) Int. Cl.
*G01C 21/34* (2006.01)
*G01C 21/36* (2006.01)
*G05D 1/00* (2006.01)
*G05D 1/02* (2020.01)
*G06Q 30/0283* (2023.01)
*G06Q 30/08* (2012.01)

(52) U.S. Cl.
CPC ....... *G01C 21/3685* (2013.01); *G05D 1/0088* (2013.01); *G05D 1/0278* (2013.01); *G06Q 10/0631* (2013.01); *G06Q 30/0284* (2013.01); *G06Q 30/08* (2013.01)

(58) Field of Classification Search
USPC .......................................................... 705/5
See application file for complete search history.

(56) References Cited

U.S. PATENT DOCUMENTS

| | | | |
|---|---|---|---|
| 7,834,778 B2 | 11/2010 | Browne et al. | |
| 8,428,918 B2 | 4/2013 | Atrazhev et al. | |
| 8,947,261 B1* | 2/2015 | Woodard | G08G 1/141 340/905 |
| 2006/0250278 A1* | 11/2006 | Tillotson | G08G 1/14 340/932.2 |
| 2012/0056758 A1* | 3/2012 | Kuhlman | G08G 1/14 340/932.2 |
| 2012/0095812 A1 | 4/2012 | Stefik et al. | |
| 2013/0265174 A1* | 10/2013 | Scofield | G08G 1/146 340/932.2 |
| 2013/0268187 A1 | 10/2013 | Scofield et al. | |
| 2015/0088790 A1* | 3/2015 | Chidlovskii | G06Q 30/0202 706/12 |
| 2015/0161891 A1* | 6/2015 | Dance | G08G 1/146 705/7.11 |
| 2015/0262431 A1 | 9/2015 | Berman et al. | |
| 2015/0338226 A1* | 11/2015 | Mason | G01C 21/3605 701/408 |
| 2016/0178376 A1* | 6/2016 | Moore | G08G 1/0133 701/538 |
| 2016/0189435 A1 | 6/2016 | Beaurepaire | |
| 2017/0191849 A1* | 7/2017 | Agam | G08G 1/148 |
| 2017/0212511 A1* | 7/2017 | Paiva Ferreira | G08G 1/22 |
| 2017/0323227 A1* | 11/2017 | Sadeghi | G06Q 20/102 |
| 2018/0283894 A1* | 10/2018 | Alneghaimish | G08G 1/04 |
| 2019/0135275 A1* | 5/2019 | Park | G05D 1/0282 |

OTHER PUBLICATIONS

"Are Seat and Aisle Interferences Affecting the Overall Airplane Boarding Time? An Agent-Based Approach," by Camelia Delcea, Liviu-Adrian Cotfas, Liliana Craciun, and Anca Gabriela Molanescu, Nov. 15, 2018 (Year: 2018).*
"Evaluating Classical Airplane Boarding Methods Considering COVID-19 Flying Restrictions," by Liviu-Adrian Cotfas, Delcea, Camelia, Milne, R John, and Salari, Mostafa, 2020 (Year: 2020).*
"Why the Airline Boarding Process Is All Wrong," by Brian Sumers, Feb. 17, 2016, (Year: 2016).*
"A multi-Agent Based Vehicles Re-routing System for Unexpected Traffic Congestion Avoidance," Shen Wang, Soufiene Djahel, and Jennifer McManis, International Conference on Intelligent Transportation Systems, Oct. 8-11, 2014 (Year: 2014).*
Melanie Lefkowitz, "Smart Parking Software Could Ease Congestion, Save Time", Cornell Chronicle, Jun. 8, 2020.
Wang, et al., "A Multi-Agent Based Vehicles Re-routing System for Unexpected Traffic Congestion Avoidance", IEEE 17th International Conference on Intelligent Transportation Systems, pp. 2541-2548, Oct. 8-11, 2014, Qingdao, China.
Pan, et al., "Proactice vehicle re-routing strategies for congestion avoidance", 2012 8th IEEE International Conference on Distributed Computing in Sensor Systems, pp. 265-272, Department of Computer Science New Jersey Institute of Technology, 2012.
Corresponding International Patent Application No. PCT/US2017/058429, International Preliminary Report on Patentability, dated Apr. 30, 2019.
Corresponding International Patent Application No. PCT/US2017/058429, International Search Report and Written Opinion, dated Jan. 3, 2018.

* cited by examiner

PARKING SPACE ROUTING

RELATED APPLICATION

This application claims priority to and is a continuation of U.S. application Ser. No. 15/336,966, filed on Oct. 28, 2016, entitled "PARKING SPACE ROUTING", which is incorporated by reference herein in its entirety.

BACKGROUND

Many drivers may utilize public or private parking spots when traveling to a destination. In an example, a driver may use on-street parking when traveling to a trendy new urban restaurant in a city. In another example, the driver may park in a parking lot or parking deck for a county fair. The driver may waste significant time and fuel, which may increase pollution, while attempting to locate available parking spaces. Many locations and/or events may utilize a parking region, such as the parking lot, a field, the parking deck, etc., for parking vehicles. For example, during a concert, parking attendants may be placed throughout a parking lot field in order to manually route drivers to particular parking spots. Unfortunately, the use of parking attendants may be costly and imprecise (e.g., parking attendants may have to communicate using walkie-talkies in order to do any coordination of how and where to park vehicles). If there are no parking attendants, then drivers may be left to themselves for identifying and navigating to parking spaces, which can cause congestion, accidents, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for parking space routing are provided. In an example, parking data of a parking region (e.g., a parking lot being used to park vehicles for a music festival) may be retrieved from one or more data sources (e.g., real-time sensor data of vehicles such as global positioning system (GPS) data, video or imagery from a vehicle camera, telemetry data, etc.; parking meter transaction data; images from parking space cameras; information from a parking website; traffic flow into and out of the parking region; etc.). The parking data, from the various data sources, may be aggregated together to create aggregated parking data. For example, parking data from different data sources may be weighted based upon what type of data provider provided the parking data (e.g., real-time parking data imagery from a camera may be more trustworthy and precise and thus is weighted higher than non-real-time parking data from a parking website that is updated every hour). Outliers may be removed from the aggregated parking data (e.g., if a set of data sources provide similar parking occupancy data, then a data source that provides parking occupancy data that deviates from the set of data sources above a threshold may be filtered from the aggregated parking data, such as where a data source is providing stale data from a night before where all parking spaces were previously available).

A set of available parking spaces may be identified within the parking region based upon the parking data (e.g., parking spaces within the parking lot used for the music festival). For example, the parking data may be indicative of 10 parking spaces being available (e.g., based upon an analysis of real-time imagery such as satellite imagery or camera imagery of the parking lot; based upon parking space sensors configured to detect whether a vehicle is present within a parking space; based upon parking occupancy prediction analysis of the parking data such as where parking occupancy is predicted based upon vehicle flow into and out of the parking lot, etc.) and/or locations of such parking spaces within the parking lot. Routes may be computed from a current location of a vehicle (e.g., a vehicle associated with a computing device, such as a smart phone, smart glasses, a wearable device, a vehicle navigation unit, etc. through which a route can be displayed to a driver of the vehicle) to the set of available parking spaces (e.g., routes to each available parking space, multiple routes to a single parking space if there are more than one route, etc.

The routes may be ranked based upon a ranking metric to create a set of ranked routes. For example, the routes may be ranked based upon a convenience metric (e.g., a preference for routes with wide open lanes; paved routes compared to grass or dirt routes; a proximity of a parking space to an entrance or exit of the music festival, an exit or entrance of the parking lot, to a parking attendant, to a parking lot light, to a bathroom, etc.), a congestion metric (e.g., a route through the parking lot that avoids other vehicles traveling within the parking lot or attempting to park), a shortest route metric, a fastest route metric, whether an available parking space is a next parking space to fill of a parking space fill ordering, etc. In this way, a route, of the set of ranked routes, to an available parking space may be provided to a driver of the vehicle based upon the route having a ranking above a threshold (e.g., a highest ranked route). In an example, the route may be provided to autonomous driving functionality of the vehicle for automatically driving the vehicle to the parking space, thus providing automated routing and navigation of vehicles to parking spaces within the parking region (e.g., certain routes and/or parking spaces may be assigned to vehicles as such vehicles entering or come within a threshold distance of the parking region).

A parking meter reservation interface may be provided to the driver. The parking meter reservation interface may allow the driver to reserve parking spaces ahead of time. However, if the driver does not reach a reserved parking space within a threshold time, then the reserved parking spaces becomes available again. The parking meter reservation interface provides the driver with real-time information regarding an occupied parking space at which the driver parked (e.g., an amount of time remaining; an alert that parking will expire within a certain timespan; imagery of the parking space and the driver's vehicle from a camera for improved security; a request from another driver to purchase's the driver's remaining parking time; weather information for the parking space; recommendations, coupons, and/or other information to locations near the parking space such as restaurants and business; walking directions from a location of a computing device hosting the parking meter reservation interface to the parking space; etc.). The parking meter reservation interface may allow the driver to pay for additional parking time (e.g., an alert may be provided before the parking meter expires, such as 10 minutes before expiration). The parking meter reservation interface provides the driver with an ability to send a message to a parking attendant. The parking meter reservation interface provides the driver with a notification that parking has expired and an outstanding parking ticket is available to pay such that the user can pay for the parking ticket through the parking meter reservation interface (e.g., if the driver pays within a certain time span of receiving notice of the parking ticket, the driver may be afforded a discount for quick pay; the driver may sign up for autopay for parking tickets and thus may receive a discount; etc.). Where multiple drivers may be interested in a parking space, the parking meter reservation interface may provide a parking space bidding interface through which users may bid on the parking space (e.g., a winning bid may be based upon a bid price, a first come first serve for reserving the parking space, a longest time waiting for a parking space, a closest proximity to the parking space, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
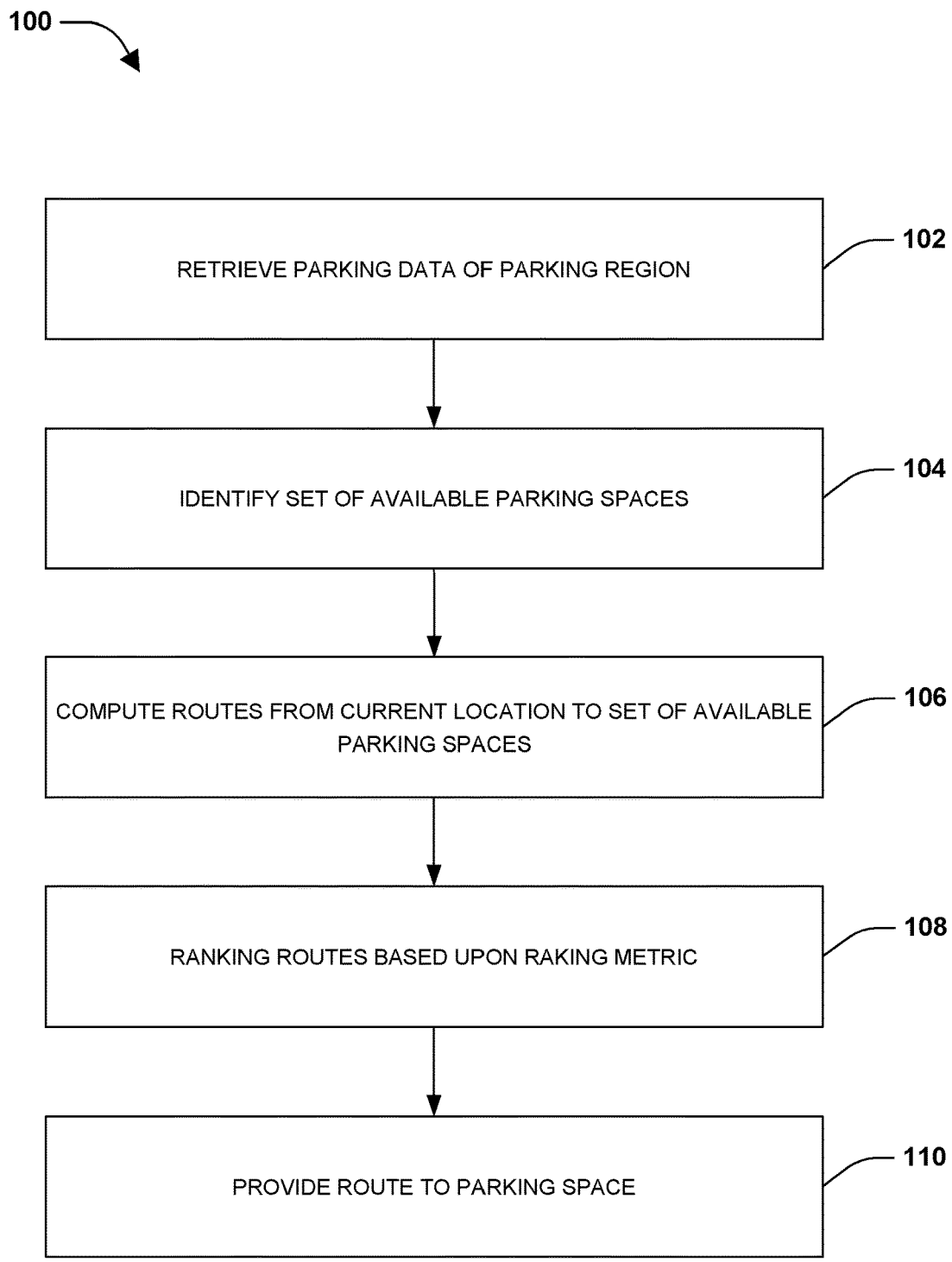
FIG. 1 is a flow diagram illustrating an exemplary method of parking space routing.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for parking space routing are provided. For example, a location or event may provide drivers with parking access to a parking region, such as a parking lot, a field, a parking deck, etc. Parking attendants may be hired to help manually direct drivers to available parking spaces. For example, the parking attendants may utilize communication devices such as walkie-talkies, flags for directing vehicles, flashlights to see in the dark, etc. Unfortunately, the parking attendants may not provide efficient and precise routing of vehicles to available parking spaces in a manner that reduces congestion, increases convenience, improves parking speed, reduces driving distance, etc. If there are no parking attendants, then drivers may be left to themselves for identifying and navigating to available parking spaces, which can cause congestion, create accidents, etc.

Accordingly, as provided herein, parking data of the parking region may be retrieved from one or more data sources (e.g., parking meter transaction data, a camera, vehicle sensor data, parking space sensors, etc.). Available parking spaces within the parking region may be identified based upon the parking data. Routes from a current location of a vehicle to the available parking spaces may be created. The routes are ranked based upon various ranking metrics such as a convenience metric (e.g., a route through the parking lot that has wide open lanes; a route to a parking space near a lamp post; a route to a parking space near an entrance to a building, near an exit of the parking region, near a parking attendant station, near a bathroom, etc.), a congestion metric (e.g., a route through the parking lot that avoids other vehicles traveling within the parking lot or attempting to park), a shortest route metric, a fastest route metric, whether an available parking space is a next parking space to fill of a parking space fill ordering, etc. In this way, a ranked route may be provided to a driver that will route the driver to an available parking space in a manner that may reduce congestion in the parking lot, increase convenience of the driver reaching the available parking space, reduces a time to reach an available parking space, reduces a driving distance to the available parking space, fills parking spaces in a desired order (e.g., fill parking spaces in an order the reduces congestion as more vehicles enter the parking lot seeking parking), etc. In this way, vehicles may be efficiently routed through the parking lot to available parking spaces using routes that are automatically constructed, which reduces costs, errors, and inefficiencies otherwise incurred when using parking attendants or allowing users to manually identify and navigate to available parking spaces.

Also, current autonomous driving functionality may not be capable of identifying available and desirable parking spaces and routes to such parking spaces through a parking region such as a parking lot. Accordingly, the route may be provided to autonomous driving functionality of the vehicle for automatically driving the vehicle to the parking space, thus providing automated routing and navigation of vehicles to parking spaces within the parking region (e.g., certain routes and/or parking spaces may be assigned to vehicles as such vehicles entering or come within a threshold distance of the parking region, which may reduce congestion and improve efficiency of parking vehicles).

An embodiment of parking space routing is illustrated by an exemplary method 100 of FIG. 1. In an example, a parking region, such as a parking lot, may be used by a stadium for parking users that will be attending a sporting event. Instead of using parking attendants or having users park themselves which can lead to congestion, accidents, inefficiencies, costs, etc., the users may be automatically routed to available parking spaces using routes that are ranked and selected based upon various ranking metrics to provide for improved routing.

At 102, parking data of the parking region may be retrieved from a first data source (e.g., occupancy information from parking meters, imagery of the parking lot from a camera or video, vehicle sensor data such as global position system (GPS) data of vehicles within the parking region that is indicative of vehicles parked within parking spaces, parking data extracted from a parking website for the parking lot, etc.). In an example, a plurality of parking data may be retrieved form a plurality of data sources, such as the first data source (e.g., a real-time data provider such as vehicle sensors) and a second data source (e.g., the parking website that is a non-real-time data provider). The plurality of parking data, from the various data sources, may be aggregated to create aggregated parking data. For example, if the first data source provides a first parking occupancy for one or more parking spaces and the second data source provides second parking occupancy for the one or more parking spaces, then the first parking occupancy may be weighted based upon the first data source being a first type of data provider and the second parking occupancy may be weighted based upon the second data source being a second type of data provider (e.g., the first parking occupancy may be weighted higher than the second parking occupancy based upon the first data source being more trusted as accurate than the second data source, such as where the first data source is real-time parking sensor data and the second data source is a parking website that may comprise stale information from the night before where all parking spaces were reported as available). In this way, the first parking occupancy may be preferred over the second parking occupancy. Such aggregation and weighting may be perform for the plurality of parking data and data sources.

In an example, outliers within the plurality of parking data may be removed to create processing parking data. For example, multiple data sources may provide similar parking occupancy information, while one data source may provide different parking occupancy information (e.g., due to having stale data), and thus outlier parking occupancy information from the data source may be removed. In an example, if parking data is not available for certain parking spaces, then parking occupancy may be estimated based upon various information such as parking occupancy of nearby parking spaces, traffic flow within or to/from the parking lot, estimations based upon when parking meters are expected to expire, etc. In this way, the parking data may be aggregated and/or processed for the identification of available parking spaces. Accordingly, a set of available parking spaces within the parking region may be identified based upon the parking data, at 104.

At 106, routes from a current location of a vehicle to the set of available parking spaces may be computed (e.g., a vehicle associated with a user of a computing device through which routing was requested, such as a through a vehicle navigation unit, a mobile device, a smart phone, a wearable device, etc.). Routes may be computed for each parking space and/or multiple routes to a single parking space may be computed. The routes may be ranked based upon a ranking metric to create a set of ranked routes. In an example, a route may be ranked based upon a congestion ranking metric (e.g., vehicles that are stopped or moving slowly along the route may be indicative of congestion, which may be identified from GPS data, camera data, telemetry data, etc.). In this way, a first route to a first parking space may be preferred over a second route to a second parking space if the first route has less congestion even though the first route may be longer. In another example, the route may be ranked based upon a convenience metric (e.g., routes with wider lanes, less obstacles, paved compared to dirt or grass, closer to an entrance, closer to an exit, etc.). In another example, the route may be ranked based upon length of the route, distance to the entrance, distance to the exit, distance to a light pole, distance to a parking attendant station, distance to a bathroom, etc.

In another example, the route may be ranked based upon whether the route leads to a parking space that is relatively more desirable and/or efficient to fill next (e.g., leads to less congestion for subsequent vehicles attempting to find and/or fill parking spaces). For example, it may be desirable to fill parking spaces in consecutive order long one row (e.g., starting at a parking space furthest from an entrance to the row so that a vehicle navigation and parking within the furthest parking space does not block subsequent vehicles parking closer to the entrance), and then in consecutive order along a next row, etc. It also may be desirable to first fill rows further from an entrance to the parking lot than rows closer to the entrance in order to avoid congestion of vehicles entering the parking lot (e.g., a vehicle navigation to a furthest row may clear out of the way of vehicles navigating to closer rows, as opposed to subsequent vehicles waiting for the vehicle to park in order to pass the vehicle to find further away parking spaces).

Accordingly, a parking space fill ordering for sequentially filling parking spaces of the parking region may be determined. For example, a set of parking rows within the parking region may be defined. A row fill order of the set of parking rows may be specified (e.g., fill rows furthest from an entrance of the parking lot first so that subsequent vehicles are not waiting on a vehicle to park before passing the vehicle to find further away parking, thus allowing multiple vehicles to concurrently park in different parking spaces and/or rows). A parking space fill order for parking spaces within the set of parking rows may be specified (e.g., fill parking spaces furthest from an entrance to the row first so that vehicles parking within that row are not waiting on a vehicle to park in order to pass that vehicle to find a parking space past the vehicle, thus allowing multiple vehicles to concurrently park in different parking spaces in the row). The parking space fill ordering may be determined based upon the row fill order and/or the parking space fill order. The route may be ranked based upon a correlation of the parking space to a next parking space to fill of the parking space fill order (e.g., routes to parking spaces closer to the next parking space may be ranked higher than routes to further away parking spaces). In this way, a route, of the set of ranked routes, to an available parking space may be provided based upon the route having a ranking above a threshold (e.g., a highest ranked route). The route may be provided through a user interface of a computing device or may be provided to autonomous driving functionality of the vehicle for automated navigation and parking within the parking space.

Figure 2:
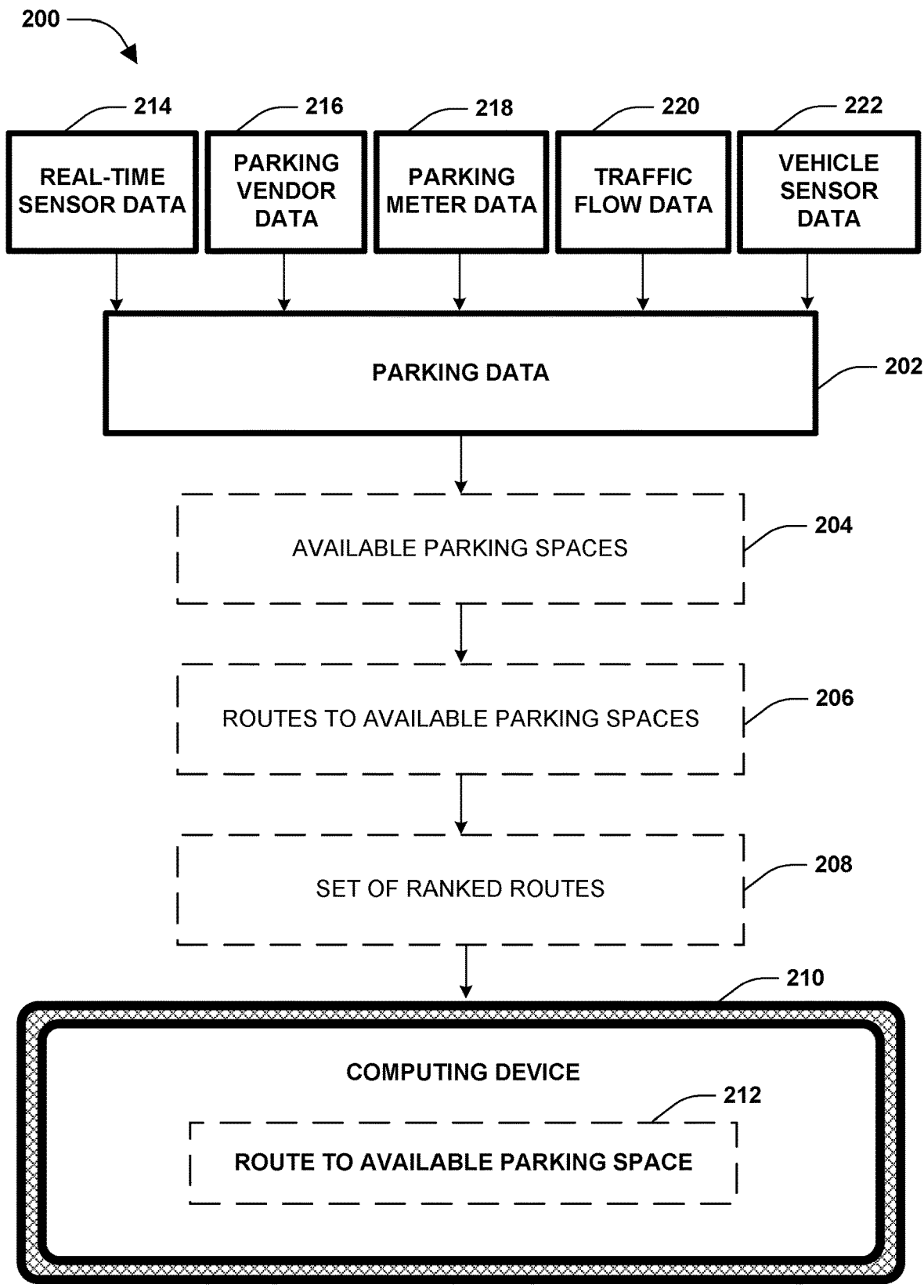
FIG. 2 is a component block diagram illustrating an exemplary system for parking space routing.

FIG. 2 illustrates an example of a system 200 for parking space routing. Parking data 202 for a parking region may be obtained from various data sources, such as real-time sensor data 214 (e.g., imagery from a camera, video from the camera, sensors capable of detecting the presence of a car at a parking space, etc.), parking vendor data 216 (e.g., parking vendors may provide parking occupancy data through websites, services, etc.), parking meter data 218, traffic flow data 220 (e.g., GPS, telemetry, and/or other locational information provided by vehicles near the parking region), vehicle senor data 222 (e.g., camera data from a vehicle), etc. For example, the parking data 202 for a parking deck being used for a concert may comprise vehicle sensor data, parking deck entry and exit data, and/or parking space sensors. Available parking spaces 204 within the parking region may be identified.

Routes 206 from a current location of a vehicle to the available parking spaces may be computed (e.g., multiple entrances and ramps may be used to enter the parking deck and/or navigate between deck levels). The routes 206 may be ranked based upon a ranking metric to create a set of ranked routes 208. For example, an available parking space near an entrance of the parking deck may be ranked higher if there are no vehicles waiting behind the vehicle (e.g., little to no congestion would result from the vehicle attempting to park within the available parking space, and the available parking space may be closer to the vehicle and to a pedestrian exit). However, if there are vehicles behind the vehicle, then the available parking space may be ranked lower because of the potential for congestion of subsequent vehicles waiting for the vehicle to park in order to pass the vehicle to gain access to further away parking spaces. In an example, congestion may be reduced if parking spaces that are spaced apart are individually assigned to the vehicles waiting to park, and thus routes may be ranked differently for each vehicle so that the vehicles are not waiting on other vehicles to park before pass such vehicles to reach available parking space (e.g., for a line of three vehicles waiting to park, a front vehicle may be assigned to a parking space on a third level, a middle vehicle may be assigned to a parking space on a second level, and a last vehicle may be assigned to a parking space on the first level, thus the last vehicle is not waiting on the front and middle vehicles to park before reaching an available parking space). A route 212, of the set of ranked routes 208, to an available parking space may be provided such as through a computing device 210 of the vehicle based upon the route 212 having a highest rank for that vehicle.

Figure 3:
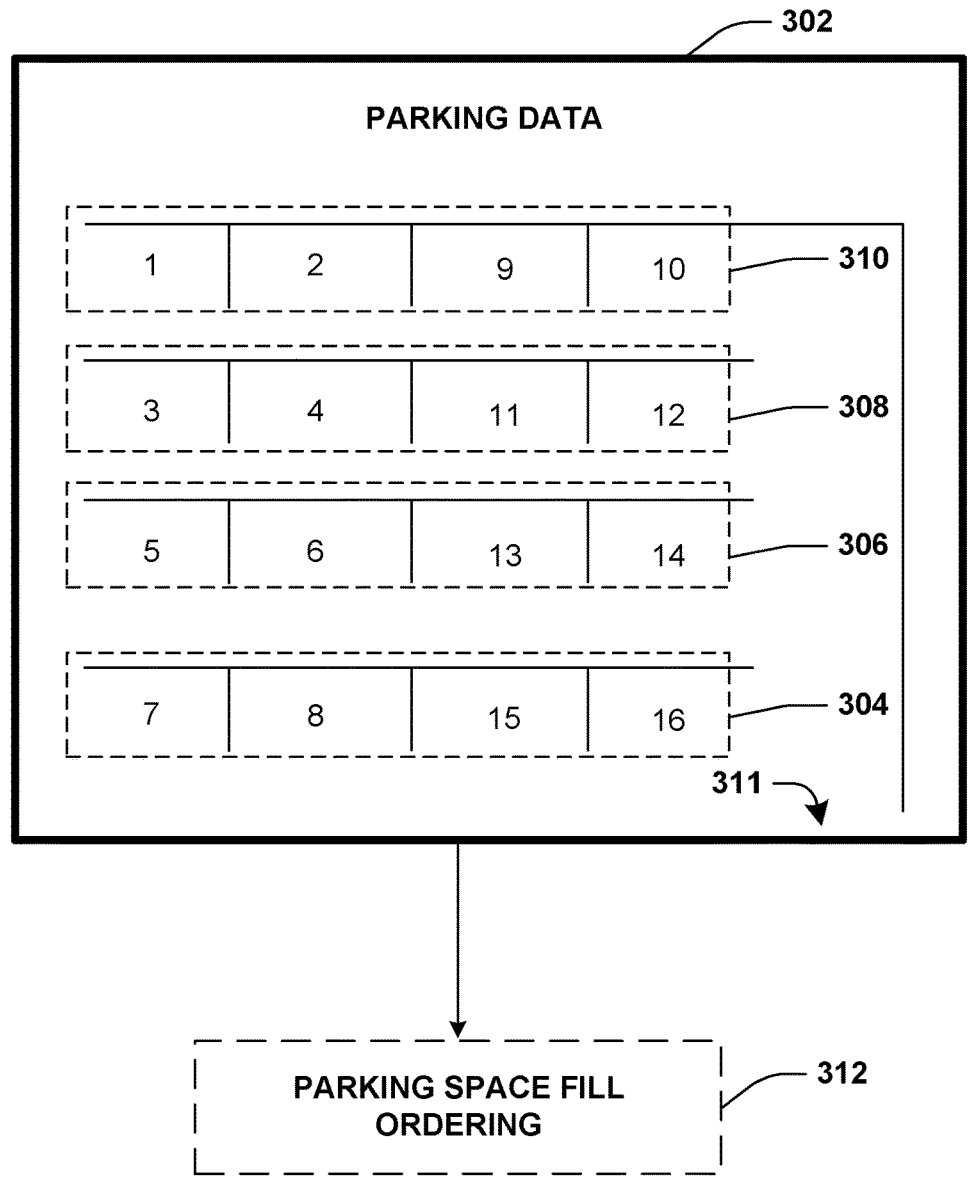
FIG. 3 is a component block diagram illustrating an exemplary system for parking space routing, where a parking space fill ordering is determined.

FIG. 3 illustrates an example of a system 300 for determining a parking space fill ordering 312 used to rank routes and/or available parking spaces. For example, parking data 302 may be obtained for a parking region. A set of parking rows within the parking region may be defined. For example, a first row 304 encompassing a first set of parking spaces closest to an entrance 311 of the parking region, a second row 306 encompassing a second set of parking spaces, a third row 308 encompassing a third set of parking spaces, and a fourth row 310 encompassing a fourth set of parking space further from the entrance 311 may be defined. In an example, a parking space fill order may be specified for parking spaces within the set of parking rows. For example, parking space (1) and parking space (2) of the fourth row 310 may be designated to be filled first (e.g., allowing other vehicles to enter the parking region in order to reduce congestion at the entrance 311 otherwise cause by vehicles attempting to park near the entrance 311). Parking space (3) and parking space (4) of the third row 308 may be designated to be filled second (e.g., vehicles can park in these parking spaces without waiting for the vehicles parking in the parking space (1) and the parking space (2)). Parking space (5) and parking space (6) of the second row 306 may be designated to be filled third (e.g., vehicles can park in these parking spaces without waiting for the vehicles parking in the parking space (3) and the parking space (4)).

Parking space (7) and parking space (8) of the first row 304 may be designated to be filled fourth (e.g., vehicles can park in these parking spaces, which are closer to the entrance 311, without waiting for the vehicles parking in the parking space (5) and the parking space (6)). Instead of sending more vehicles into the first row 304, which may cause congestion at the entrance 311, parking space (9) and parking space (10) of the fourth row 310 may be designated to be filled next. In this way, the parking space fill order may be specified. It may be appreciated that any ordering of parking spaces may be specified and that the example provided is merely for illustrative purposes. A parking space fill ordering 312 may be determined based upon the parking space fill order, a row fill order for the set of parking rows, and/or other criteria. The parking space fill ordering 312 may be used as one ranking metric for ranking routes to available parking spaces in real-time for drivers.

Figure 4:
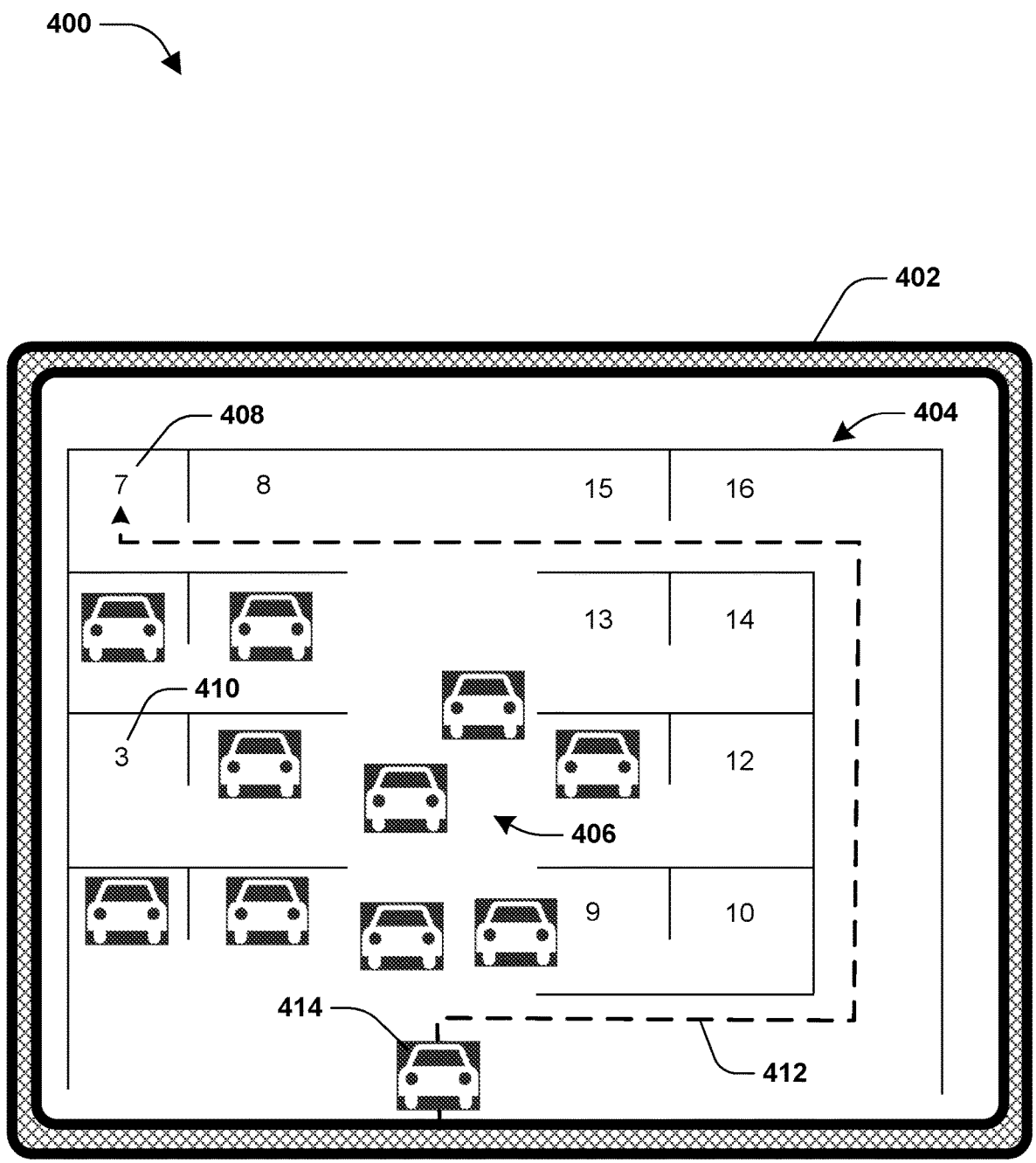
FIG. 4 is a component block diagram illustrating an exemplary system for parking space routing, where a route to a parking space is provided to a driver.

FIG. 4 illustrates an example of a system 400 for parking space routing. For example, a driver may be attempting to park a vehicle 414 within a parking region 404. Available parking spaces, such as parking space (3), parking space (7) 408, parking space (8), parking space (9), parking space (10), etc. may be identified from parking data for the parking region 404. Routes to the available parking spaces may be determined and ranked based upon various criteria. For example, routes to the parking space (3) 410, the parking space (9), the parking space (10), a parking space (12), etc. may be blocked by congestion 406, and thus may be ranked lower, based upon a congestion metric, than routes to the parking space (7) 408, the parking space (8), a parking space (15), a parking space (16), etc. If no vehicles are behind and waiting on the vehicle 414, then the parking space (16) may be assigned a higher rank than the parking space (7) 408, the parking space (8), and the parking space (15) because the parking space (16) is closer to a current location of the vehicle 414. However, if there are vehicles behind and waiting on the vehicle 414, the parking space (7) 408 may be ranked higher because routing the vehicle 414 to the parking space (7) 408 may not unduly add to congestion of vehicles behind the vehicle 414 that can be routed to parking space (8), parking space (15), etc. (e.g., otherwise, a vehicle may have to wait on vehicle 414 to park in the parking space (16) before gaining access to park at parking space (15), parking space (8), etc.). In this way, a route 412 to the parking space (7) 408 may be provided through a computing device 402 or to autonomous driving functionality of the vehicle 414.

Figure 5:
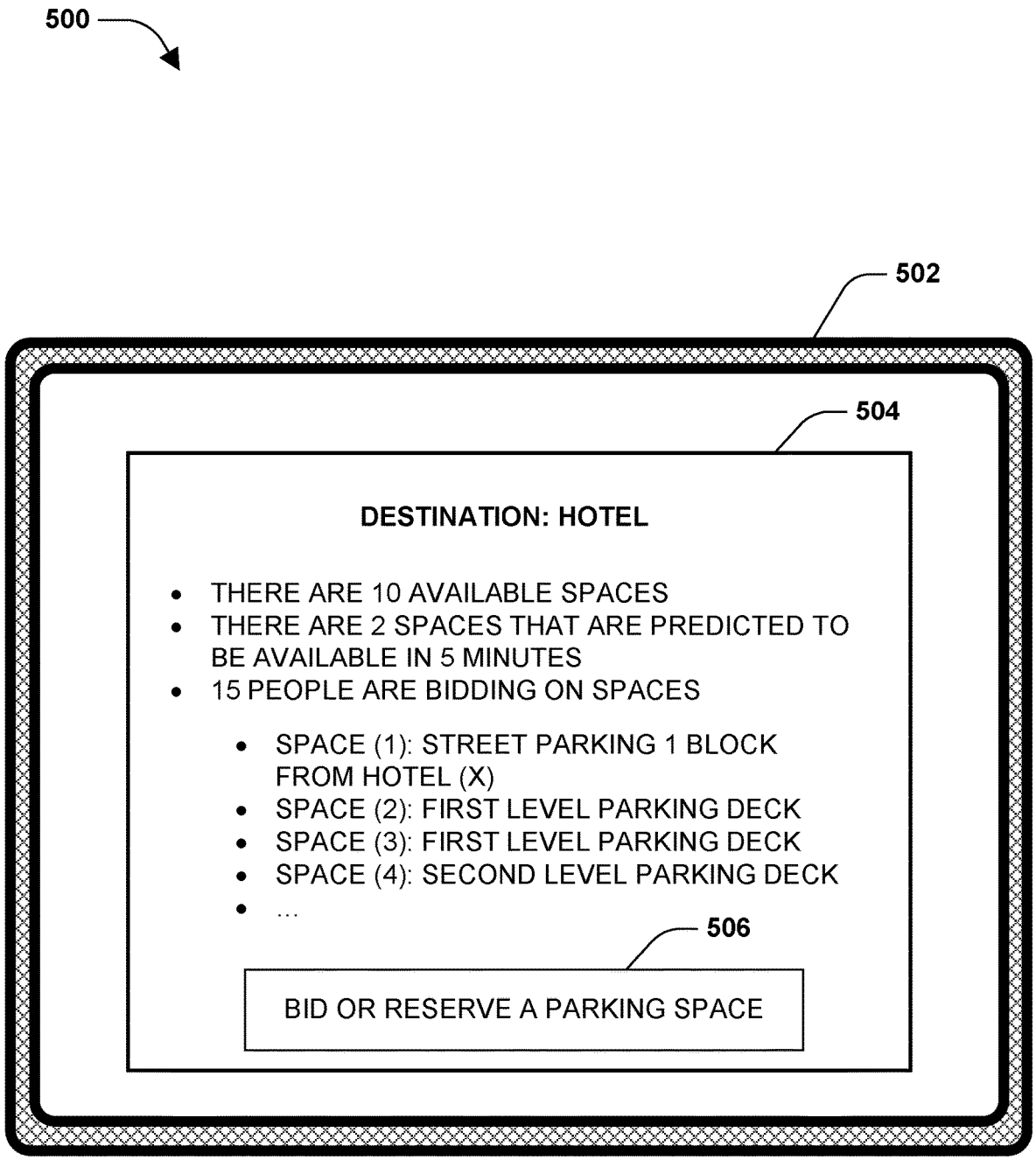
FIG. 5 is a component block diagram illustrating an exemplary system for parking space routing, where a parking meter reservation interface is provided to a driver.

FIG. 5 illustrates an example of a system 500 for providing a parking meter reservation user interface 504, for reserving parking spaces, through a device 502 such as a mobile device, a wearable device, etc. For example, a driver may express an interest in traveling to a hotel that is a 5 minute drive away. The parking meter reservation user interface 504 may be populated with parking information associated with parking spaces within a threshold distance (e.g., a nearby parking deck, on-street parking, etc.) of the hotel. For example, the parking meter reservation user interface 504 may specify that there are 10 available parking spaces, which may be determined based upon parking data (e.g., meter transaction data) for the parking spaces. The parking meter reservation user interface 504 may specify that there are 2 parking spaces that are predicted to be available in 5 minutes (e.g., the meter transaction data may indicate that the 2 parking spaces are set to expire within a few minutes). The parking meter reservation user interface 504 may specify information related to the available parking spaces, such as their location and/or proximity to the hotel. It an example, supplementary data may be provided through the parking meter reservation user interface 504, such as coupons, social network posts about points of interest nearby the parking spaces, weather information, live video stream of parking spaces so that a user can see a parking space, recommendations of points of interest nearby the parking spaces, whether there is a human parking attendant available, proximity to a bathroom, cost, etc.

The parking meter reservation user interface 504 may specify that 15 people are currently bidding on the available parking spaces. In this way, the driver may access 506 bidding and/or reservation functionality for parking spaces through the parking meter reservation user interface 504. In an example of the bidding functionality, a set of users interested in the parking space (1) may be identified. The set of users may be provided with access to a parking space bidding interface, through which users can submit bids to reserve the parking space (1) (e.g., bidding based upon a first come first serve, bidding based upon a highest bid price, bidding based upon a closest vehicle proximity to the parking space (1), bidding based upon a longest waiting user for a parking space, etc.). In this way, parking access to the parking space (1) may be granted and the parking space (1) may be reserved based upon an evaluation of one or more parking bids submitted through the parking space bidding interface (e.g., a submission of a bid price used to evaluate bids on a highest bidder basis, a submission of a vehicle proximity used to evaluate bids on a closest proximity basis, a submission of a timestamp used to identify who is the first driver to submit a bid for evaluating bids on the first come first serve basis, etc.). In this way, a winning bidder can reserve and/or pay for the parking space (1) (e.g., even if the winning bidder is not yet physically present at the parking space (1)). Various techniques may be used to call out a reserved parking space, such as changing a light nearby the reserved parking space from one color such as green to another color such as red, providing a visual signal, providing an audible signal, etc.

In an example of the reservation functionality, the user may reserve a parking space through the parking meter reservation user interface 504. Accordingly, the parking space may be designated as a reserved parking space. A parking timer may be started, such that if the user has not yet paid for the reserved parking space and does not reach the reserved parking space before expiration of the parking timer, then the reserved parking space may be made available for reservation or occupancy by other drivers. The parking timer may not be started and the parking space may remain reserved if the user pays for the reserved parking space regardless of whether the user has or will occupy the reserved parking space (e.g., merely a parking expiration timer may be started). When the user parks within the reserved parking space within a threshold time (e.g., before the parking timer expires) or while the parking space is available and not reserved (e.g., after the parking timer expires but before another driver reserves or occupies the parking space), the parking space may be designated as an occupied parking space and the parking expiration timer may be started.

Figure 6:
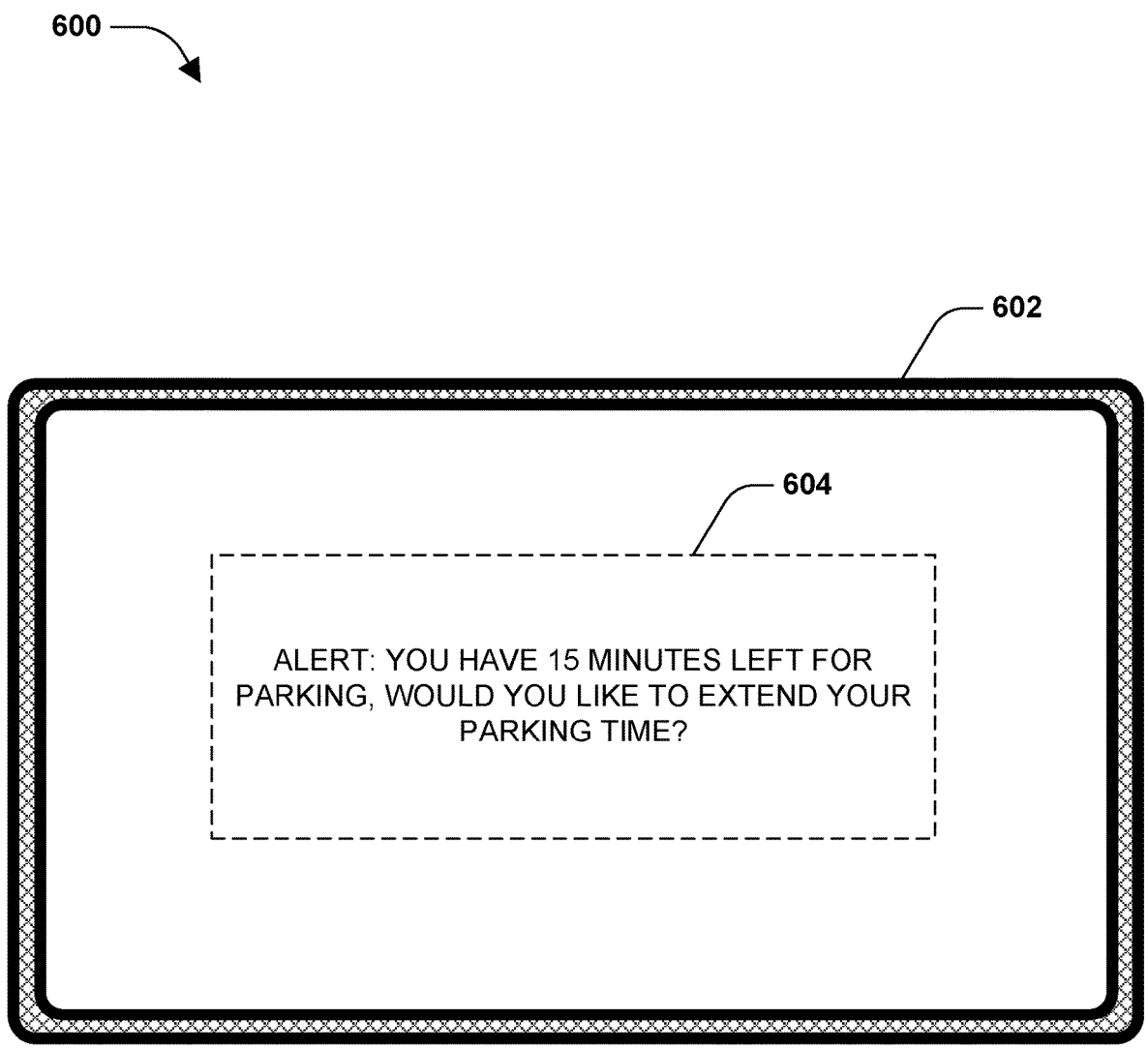
FIG. 6 is a component block diagram illustrating an exemplary system for parking space routing, where a parking meter expiration alert is provided to a driver.

FIG. 6 illustrates an example of a system 600 for providing a parking meter expiration alert 604. For example, a driver may park a vehicle within a parking space. The driver may reserve and occupy the parking space through a parking meter reservation user interface (e.g., the driver may pay for 5 hours of parking in order to attend an event). The parking meter reservation user interface allows the user to set various reminders and alerts for when the parking meter may expire (e.g., the user may specify a preference to receive alerts through text messaging, email, social network messaging, etc. when there is 15 minutes remaining and 8 minutes remaining). According, when there is 15 minutes remaining, the parking meter expiration alert 604 may be provided to the driver, such as through a computing device 602. The parking meter expiration alert 604 may link the driver to the parking meter reservation user interface so that the driver can pay for additional parking. The driver may also setup an automatic autopay extension such that when the parking space is to expire, additional time is bought in certain increments (e.g., the driver may specify that if the parking space is about to expire, then the expiration time is to be automatically extended by an additional 15 minutes).

In an example where drivers are parked within a parking deck or other parking region where the drivers pay when leaving, such drivers may be able to pay their parking fee through the parking meter reservation user interface so that the drivers may quickly and efficiently exit the parking deck without taking time to pay a parking attendant (e.g., payment confirmation and/or vehicle identification information may be provided to the parking attendant and/or an automated parking attendant device for recognizing and allowing a vehicle to exit the parking deck). In this way, vehicles may efficiently and quickly exit the parking deck to reduce time and vehicle resource consumption such as fuel consumption that leads to pollution.

Figure 7:
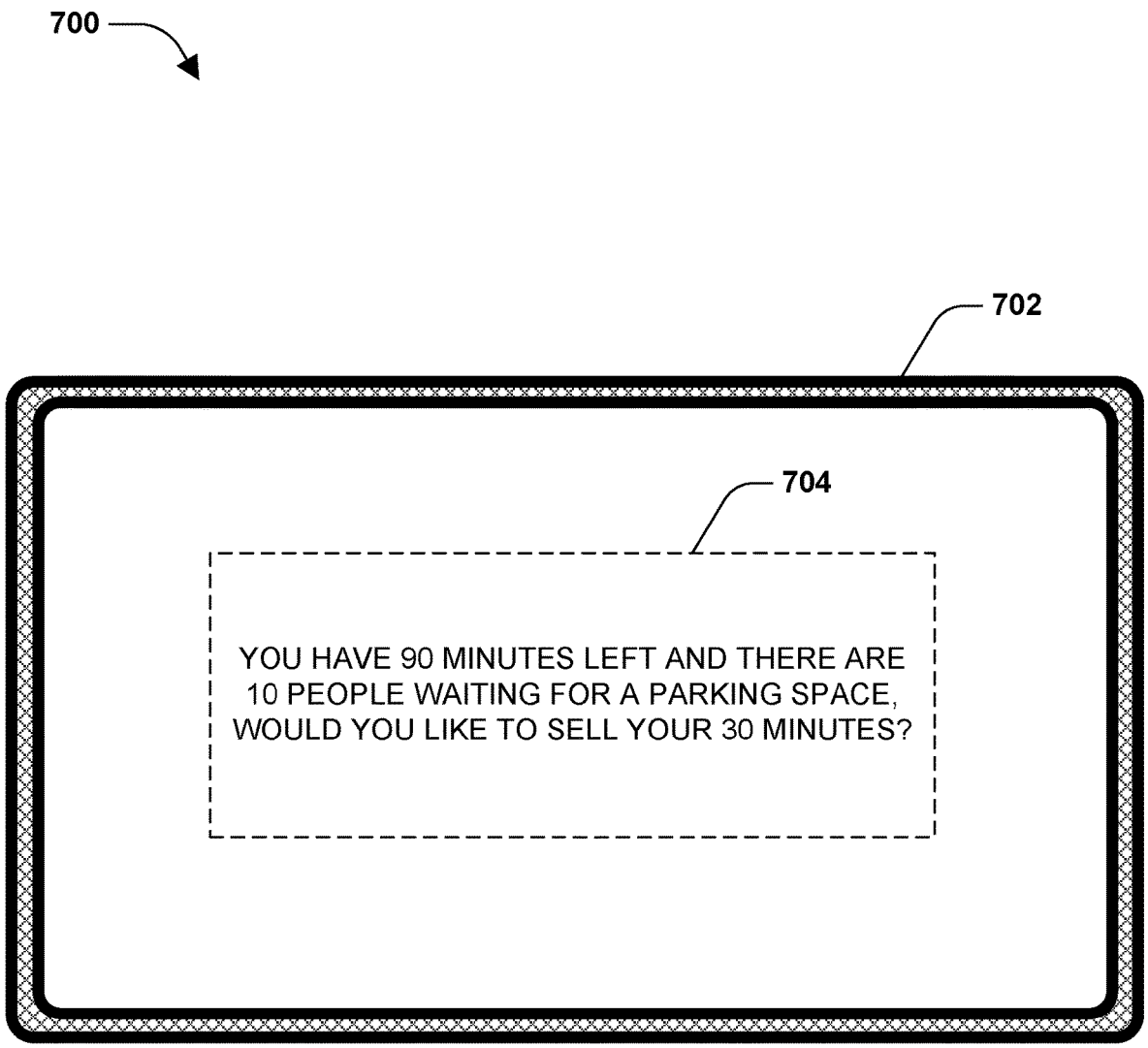
FIG. 7 is a component block diagram illustrating an exemplary system for parking space routing, where a driver can sell remaining parking time.

FIG. 7 illustrates an example of a system 700 for providing a driver with an ability to sell remaining parking space time. For example, the driver may park a vehicle within a parking space. The driver may reserve and occupy the parking space through a parking meter reservation user interface (e.g., the driver may pay for 5 hours of parking in order to attend an event). Because there may be numerous drivers seeking parking near the parking space, the driver may be provided with a notification 704, such as though a computing device 702, that other drivers are willing to purchase and/or bid on the remaining 90 minutes left for the parking space. In this way, the driver can review and/or accept any requests or bids, communicate with bidders such as to coordinate when the driver will leave the parking space, etc. In an example, a notification may be provided to the driver that other people near the parking space are seeking rides to other locations (e.g., such as in response to determining that the parking space will expire within a threshold amount of time thus indicating that the driver may be returning to the vehicle soon), and thus communication, payment, and/or other collaboration may be provided to the driver and another person to arrange for the driver to provide a ride to the other person.

Figure 8:
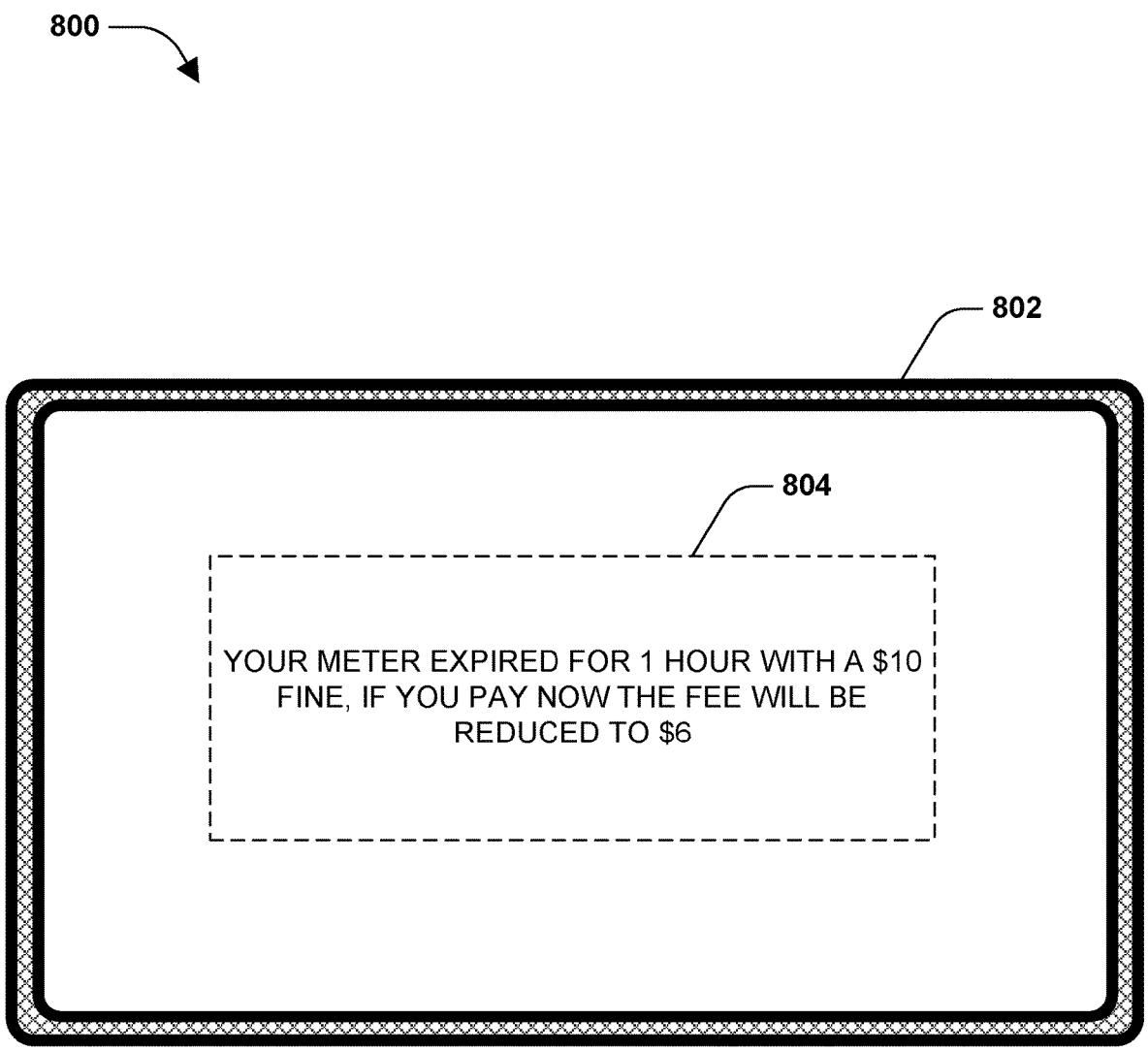
FIG. 8 is a component block diagram illustrating an exemplary system for parking space routing, where a user can pay a parking ticket for a reduced fee.

FIG. 8 illustrates an example of a system 800 for providing a driver with an ability to pay for a parking ticket at a reduced cost. For example, the driver may park a vehicle within a parking space. The driver may reserve and occupy the parking space through a parking meter reservation user interface (e.g., the driver may pay for 5 hours of parking in order to attend an event). The driver may return to the parking space 20 minutes after the parking space has expired. Accordingly, a parking fine notification 804 may be provided, such as through a computing device 802, to the driver. The parking fine notification 804 may allow the driver to pay for a $10 parking fine at any point in time. However, if the driver pays for the parking fine now or within a threshold amount of time, then the parking fine may be reduce such as to $6.

Figure 9:
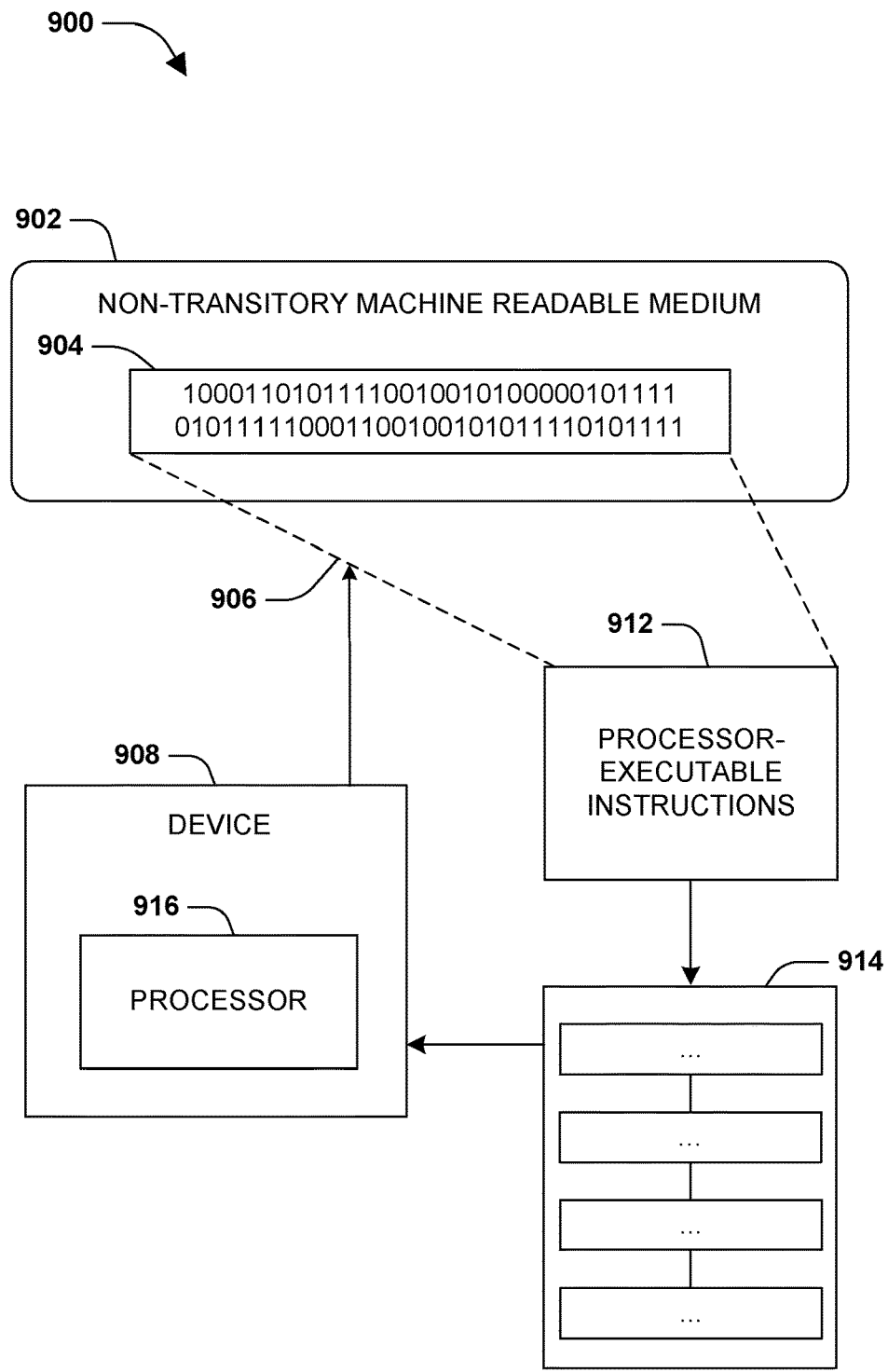
FIG. 9 is an illustration of an exemplary computing device-readable medium wherein processor-executable instructions configured to embody one or more of the provisions set forth herein may be comprised.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 100 of FIG. 1, for example. In some embodiments, the processor-executable instructions 912 are configured to cause implementation of a system, such as at least some of the example system 200 of FIG. 2, at least some of the exemplary system 300 of FIG. 3, at least some of the exemplary system 400 of FIG. 4, at least some of the exemplary system 500 of FIG. 5, at least some of the example system 600 of FIGS. 6, at least some of the example system 700 of FIG. 7, and/or at least some of the example system 800 of FIGS. 8, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
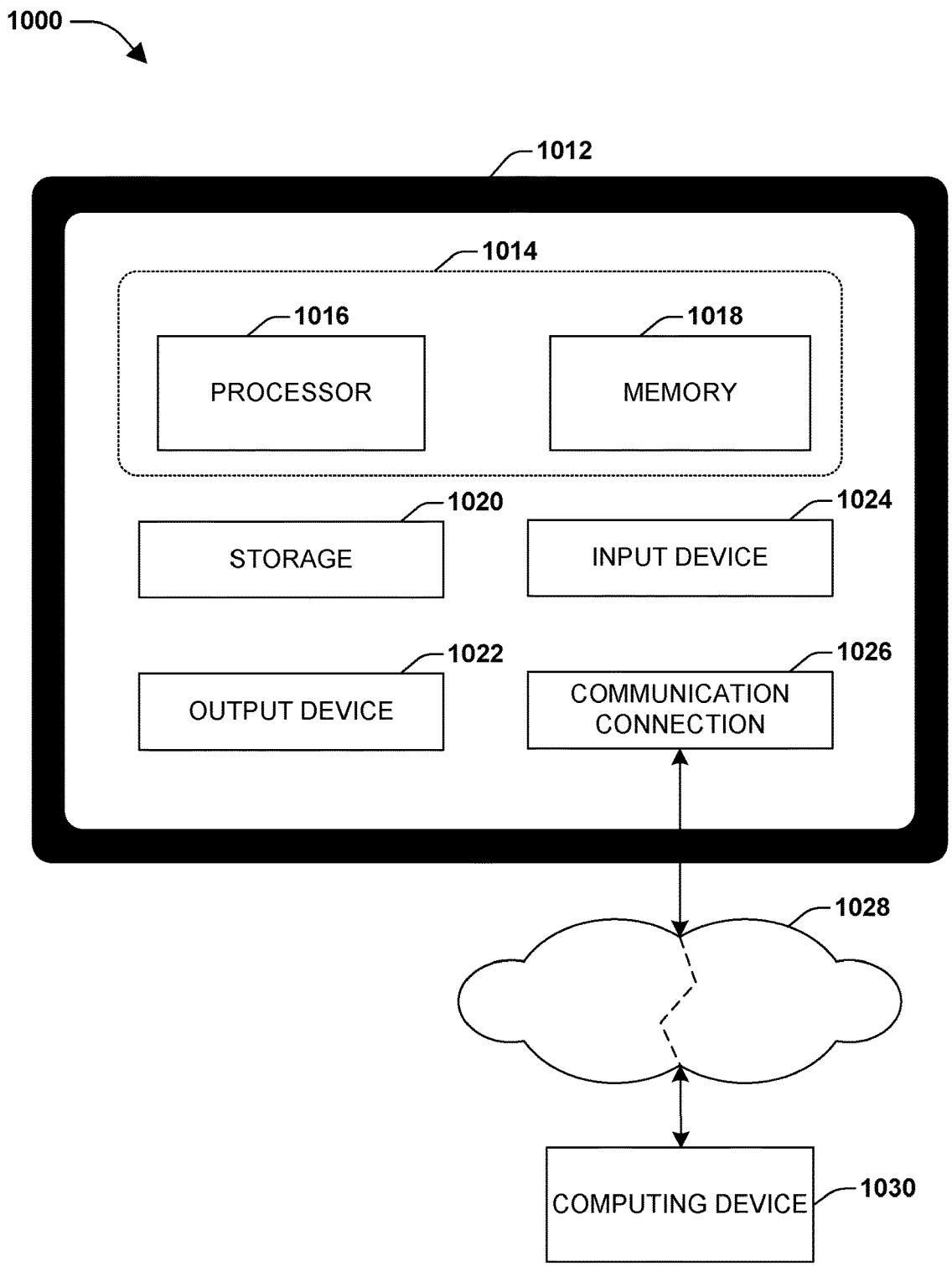
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processor 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processor 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Computer storage media does not, however, include propagated signals. Rather, computer storage media excludes propagated signals. Any such computer storage media may be part of device 1012.

Device 1012 may also include communication connection 1026 that allows device 1012 to communicate with other devices. Communication connection 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection 1026 may include a wired connection or a wireless connection. Communication connection 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device 1024 such as keyboard, mouse, pen, voice input device, touch input device, infrared cameras, video input devices, and/or any other input device. Output device 1022 such as one or more displays, speakers, printers, and/or any other output device may also be included in device 1012. Input device 1024 and output device 1022 may be connected to device 1012 via a wired connection, wireless connection, or any combination thereof. In one embodiment, an input device or an output device from another computing device may be used as input device 1024 or output device 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of parking space routing, the method executed by a processor of a computing device, and the method comprising:

executing, on the processor, instructions that cause the computing device to perform operations, the operations comprising:

retrieving parking data of a parking region from a plurality of data sources, wherein the parking data is filtered to remove outlier parking occupancy data that deviates greater than a threshold from parking occupancy data provided by data sources that provided similar parking occupancy data;

in response to determining that no parking data is available for one or more parking spaces, estimating parking occupancy data for the one or more parking spaces based upon at least one of nearby parking space occupancy, parking meter expiration estimations, or traffic flow of a parking lot comprising the one or more parking spaces;

identifying a set of available parking spaces within the parking region based upon the parking data and the estimated parking occupancy data;

computing routes from a current location of a first vehicle to the set of available parking spaces;

determining a parking space fill order of parking spaces to sequentially fill based upon a congestion metric to reduce congestion within the parking region, wherein the congestion is identified from an evaluation of data acquired over a network from slow moving or stopped vehicles along routes within the parking region;

ranking the routes based upon a ranking metric to create a set of ranked routes associated with improving routing, wherein the ranking metric is used to rank the routes to parking spaces based upon correlations of the routes being proximate to a next parking space to fill of the parking space fill order to reduce the congestion within the parking region; and providing a route, from among the set of ranked routes, to an autonomous driving functionality of the first vehicle, wherein the autonomous driving functionality operates the first vehicle to autonomously drive to a parking space based upon the route.

2. The method of claim 1, comprising:
acquiring the data, comprising at least one of GPS data, vehicle camera data, or telemetry data, over the network from the vehicles located within the parking region; and
evaluating the data to identify the vehicles that are stopped or slow moving along the routes to identify the congestion within the parking region.

3. The method of claim 1, wherein determining a parking space fill order comprises:
specifying an order to fill parking spaces in a manner that reduces congestion for vehicles entering the parking region and traveling within the parking region to parking spaces.

4. The method of claim 1, wherein the determining a parking space fill ordering comprises:
defining a set of parking rows within the parking region;
specifying a row fill order for the set of parking rows;
specifying a parking space fill order for parking spaces within the set of parking rows; and
determining the parking space fill ordering based upon the row fill order and the parking space fill order.

5. The method of claim 1, comprising:
filtering the parking data to remove parking occupancy data from a data source identified as providing stale data.

6. The method of claim 1, comprising:
aggregating the parking data to create aggregated parking data, wherein parking occupancy data from data sources identified as providing more precise data is weighted higher than parking occupancy data from data sources identified as providing less precise data; and
identifying the set of available parking spaces within the parking region based upon the aggregated parking data.

7. The method of claim 1, comprising:
determining that a first data source of first parking data is a first type of data provider;
determining that a second data source of second parking data is a second type of data provider; and
weighting the first parking data higher than the second parking data based upon the first data source being the first type of data provider and the second data source being the second type of data provider that provides less accurate data than the first type of data provider.

8. The method of claim 7, wherein the first type of data provider is a real-time data provider and the second type of data provider is a non-real-time data provider.

9. The method of claim 7, wherein the first type of data provider is a real-time sensor and the second type of data provider is a parking website.

10. The method of claim 1, comprising:
providing a parking meter reservation user interface for reserving the parking space.

11. The method of claim 10, comprising:
responsive to a user reserving the parking space through the parking meter reservation user interface, designating the parking space as a reserved parking space and starting a parking timer.

12. The method of claim 11, comprising:
responsive to the user parking within the reserved parking space within a threshold time, designating the parking space as an occupied parking space.

13. The method of claim 12, comprising:
responsive to the parking timer being within a threshold of a parking expiration time, providing an option, through the parking meter reservation user interface, to pay for additional parking time.

14. The method of claim 12, comprising:
responsive to receiving a parking space bid solicitation request from the user before the parking timer expires, sending a parking space takeover opportunity to a second user.

15. The method of claim 1, comprising:
identifying a set of users interested in the parking space;
providing the set of users with access to a parking space bidding interface; and
granting parking access to the parking space based upon an evaluation of one or more parking bids submitted through the parking space bidding interface.

16. A computing device comprising:
a processor; and
memory comprising processor-executable instructions that when executed by the processor cause performance of operations, the operations comprising:
retrieving parking data of a parking region from a plurality of data sources, wherein the parking data is filtered to remove outlier parking occupancy data that deviates greater than a threshold from parking occupancy data provided by data sources that provided similar parking occupancy data;
in response to determining that no parking data is available for one or more parking spaces, estimating parking occupancy data for the one or more parking spaces based upon at least one of nearby parking space occupancy, parking meter expiration estimations, or traffic flow of a parking lot comprising the one or more parking spaces;
identifying a set of available parking spaces within the parking region based upon the parking data and the estimated parking occupancy data;
computing routes from a current location of a first vehicle to the set of available parking spaces;
determining a parking space fill order of parking spaces to sequentially fill based upon a congestion metric to reduce congestion within the parking region, wherein the congestion is identified from an evaluation of data acquired over a network from slow moving or stopped vehicles along routes within the parking region;
ranking the set of available parking spaces based upon a ranking metric to create a set of ranked parking spaces associated with improving at least one of routing or parking, wherein the ranking metric is used to rank parking spaces based upon correlations of the routes being proximate to a next parking space to fill of the parking space fill order to reduce the congestion within the parking region; and
providing content associated with at least one of a parking space or a route to the parking space, from among the set of available parking spaces, to an autonomous driving functionality of the first vehicle, wherein the autonomous driving functionality operates the first vehicle to autonomously drive to the parking space based upon the content.

17. The computing device of claim 16, the operations comprising:
acquiring the data, comprising at least one of GPS data, vehicle camera data, or telemetry data, over the network from the vehicles located within the parking region; and
evaluating the data to identify the vehicles that are stopped or slow moving along the routes to identify the congestion within the parking region.

18. A non-transitory machine readable medium having stored thereon processor-executable instructions that when executed cause performance of operations, the operations comprising:
retrieving parking data of a parking region from a plurality of data sources, wherein the parking data is filtered to remove outlier parking occupancy data that deviates greater than a threshold from parking occupancy data provided by data sources that provided similar parking occupancy data;
in response to determining that no parking data is available for one or more parking spaces, estimating parking occupancy data for the one or more parking spaces based upon at least one of nearby parking space occupancy, parking meter expiration estimations, or traffic flow of a parking lot comprising the one or more parking spaces;
identifying a set of available parking spaces within the parking region based upon the parking data and the estimated parking occupancy data;
computing routes from a current location of a first vehicle to the set of available parking spaces;
determining a parking space fill order of parking spaces to sequentially fill based upon a congestion metric to reduce congestion within the parking region, wherein the congestion is identified from an evaluation of data acquired over a network from slow moving or stopped vehicles along routes within the parking region;
ranking the routes based upon a ranking metric to create a set of ranked routes associated with improving routing, wherein the ranking metric is used to rank the routes to parking spaces based upon correlations of the routes being proximate to a next parking space to fill of the parking space fill order to reduce the congestion within the parking region; and
providing a route, from among the set of ranked routes, to an autonomous driving functionality of the first vehicle, wherein the autonomous driving functionality operates the first vehicle to autonomously drive to a parking space based upon the route.

19. The non-transitory machine readable medium of claim 18, the operations comprising:
acquiring the data, comprising at least one of GPS data, vehicle camera data, or telemetry data, over the network from the vehicles located within the parking region; and
evaluating the data to identify the vehicles that are stopped or slow moving along the routes to identify the congestion within the parking region.

* * * * *